US006526170B1

(12) United States Patent
Matsumoto

(10) Patent No.: US 6,526,170 B1
(45) Date of Patent: Feb. 25, 2003

(54) CHARACTER RECOGNITION SYSTEM

(75) Inventor: Shinji Matsumoto, Hiroshima (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/357,251

(22) Filed: Dec. 13, 1994

(30) Foreign Application Priority Data

Dec. 14, 1993 (JP) ............................................. 5-312425

(51) Int. Cl.$^7$ ................................................. G06K 9/00
(52) U.S. Cl. ....................... 382/187; 382/177; 382/229; 704/256
(58) Field of Search ................................ 382/228, 190, 382/160, 226, 193, 196, 159, 181, 187, 197, 229, 218; 381/41, 42, 43; 395/209, 2.31, 2.65; 704/256; 707/9

(56) References Cited

U.S. PATENT DOCUMENTS

| | | | | |
|---|---|---|---|---|
| 3,482,210 A | * | 12/1969 | Lozier et al. | 340/146.3 |
| 5,321,773 A | * | 6/1994 | Kopec et al. | 382/209 |
| 5,323,486 A | * | 6/1994 | Taniguchi et al. | 395/2.31 |
| 5,438,630 A | * | 8/1995 | Chen et al. | 382/159 |
| 5,710,916 A | * | 1/1998 | Barbara et al. | 707/9 |
| 5,745,600 A | * | 4/1998 | Chen et al. | 382/218 |

FOREIGN PATENT DOCUMENTS

| | | |
|---|---|---|
| JP | A 60-230283 | 11/1985 |
| JP | A 4-96855 | 3/1992 |
| JP | A 4-275690 | 10/1992 |

OTHER PUBLICATIONS

Kundu et al., Computer Vision and Pattern Recognition, CVPR, p. 457–462, 1988.*
"An Algorith for Vector Quantizer Design", by Linde et at., IEEE Transactions on communications, vol. COM–28, No. 1, Jan. 1980 pp. 84–95.
"Speech Recognition with Probability Models", by Seiichi Nakagawa, Society of Electronics Information Communication Engineers of Japan, pp. 44–61.
35th Information Processing Conference in Japan 5k–8 pp. 2173–2174.

* cited by examiner

*Primary Examiner*—Jayanti K. Patel
(74) *Attorney, Agent, or Firm*—Sughrue Mion, PLLC

(57) ABSTRACT

A character recognition system is disclosed, In a feature extraction parameter storage section 22 a transformation matrix for reducing a number of dimensions of feature parameters and a codebook for quantization are stored. In an HMM storage section 23 a constitution and parameters of Hidden Markov Model (HMM) for character string expression are stored. A feature extraction section 32 scans a word image given from an image storage means from left to right in a predetermined cycle with a slit having a sufficiently small width than the character width and thus outputs a feature symbol at each predetermined timing. A matching section 33 matches a feature symbol row and a probability maximization HMM state, thereby recognizing the character string.

7 Claims, 4 Drawing Sheets

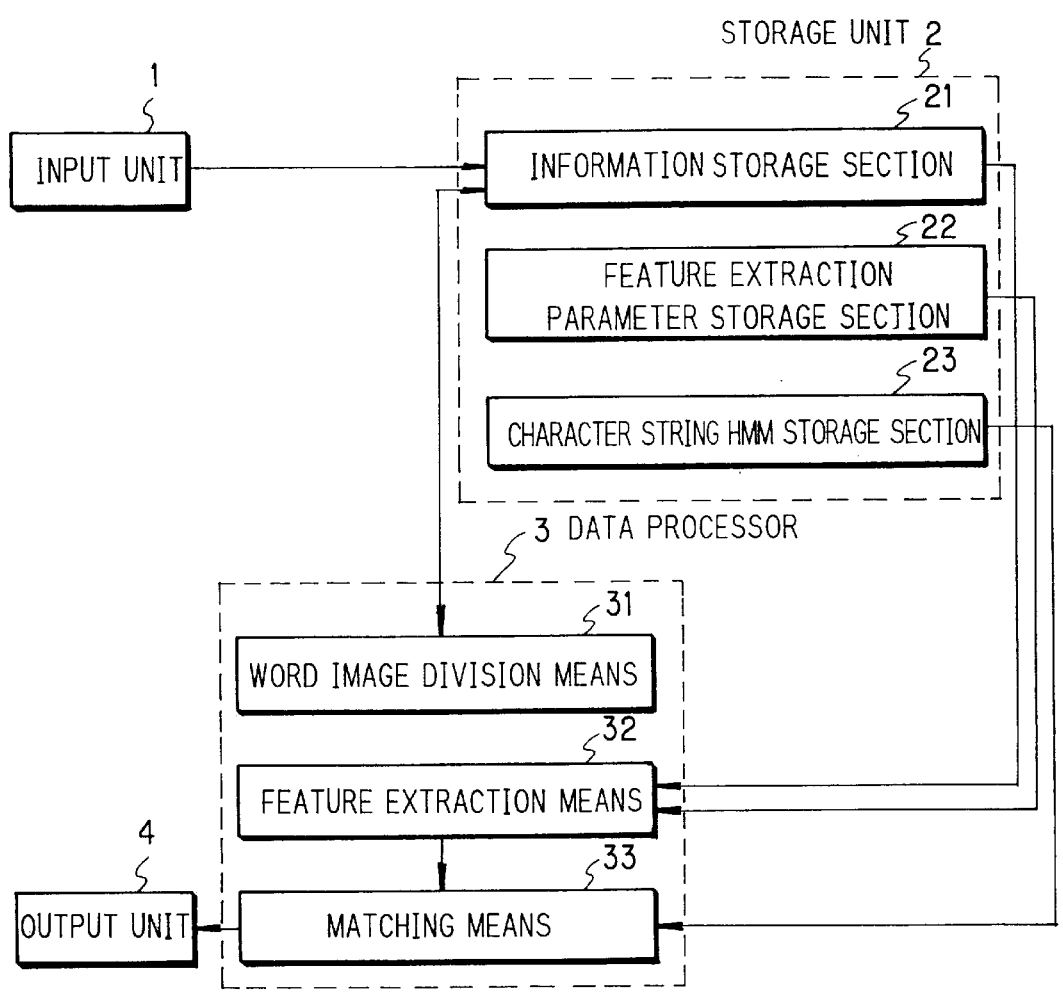
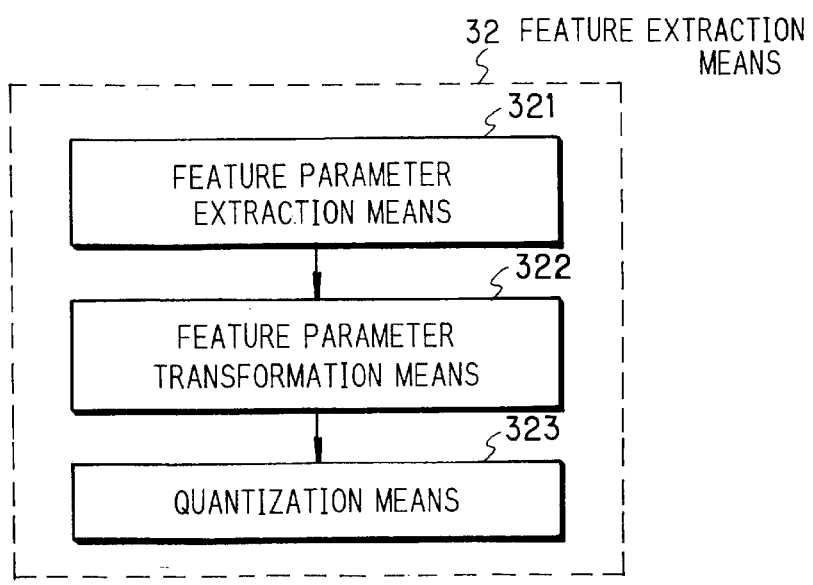

FIG. 3

$$\begin{bmatrix} 1.3 & 2.0 \\ -1.3 & 0.1 \\ 2.0 & -0.2 \\ 3.2 & 4.2 \end{bmatrix}$$

AN EXAMPLE OF TRANSFORM MATRIX

FIG. 4

| SYMBOL NUMBER | CODE VECTOR |
|---|---|
| 1 | ( 10   −2 ) |
| 2 | ( 7    25 ) |
| 3 | ( −2   −5 ) |
| 4 | ( −4   13 ) |

AN EXAMPLE OF CODEVECTOR

FIG. 6 acb

INPUT IMAGE

AN EXAMPLE OF HMM

S1 O.P., T.P.

| SYMBOL | O.P. |
|---|---|
| 1 | 0.5 |
| 2 | 0.2 |
| 3 | 0.2 |
| 4 | 0.1 |
| T.DEST. | T.P. |
| SELF-T. | 0.8 |
| NEXT S. | 0.2 |

S2 O.P., T.P.

| SYMBOL | O.P. |
|---|---|
| 1 | 0.1 |
| 2 | 0.2 |
| 3 | 0.6 |
| 4 | 0.1 |
| T.DEST. | T.P. |
| SELF-T. | 0.7 |
| NEXT S. | 0.3 |

S3 O.P., T.P.

| SYMBOL | O.P. |
|---|---|
| 1 | 0.3 |
| 2 | 0.2 |
| 3 | 0.2 |
| 4 | 0.3 |
| T.DEST. | T.P. |
| SELF-T. | 0.7 |
| NEXT S. | 0.3 |

S4 O.P., T.P.

| SYMBOL | O.P. |
|---|---|
| 1 | 0.2 |
| 2 | 0.1 |
| 3 | 0.6 |
| 4 | 0.1 |
| T.DEST. | T.P. |
| SELF-T. | 0.8 |
| NEXT S. | 0.2 |

S5 O.P., T.P.

| SYMBOL | O.P. |
|---|---|
| 1 | 0.5 |
| 2 | 0.1 |
| 3 | 0.1 |
| 4 | 0.3 |
| T.DEST. | T.P. |
| SELF-T. | 0.7 |
| NEXT S. | 0.3 |

S6 O.P., T.P.

| SYMBOL | O.P. |
|---|---|
| 1 | 0.1 |
| 2 | 0.1 |
| 3 | 0.1 |
| 4 | 0.7 |
| T.DEST. | T.P. |
| SELF-T. | 0.8 |
| NEXT S. | 0.2 |

O.P.: OUTPUT PROBABILITY
T.P.: TRANSITION PROBABILITY
T.DEST.: TRANSITION DESTINATION
SELF-T.: SELF-TRANSITION
NEXT S.: NEXT STATE

CHARACTER RECOGNITION SYSTEM

BACKGROUND OF THE INVENTION

The present invention relates to a character recognition system.

In a conventional character recognition system to read out the image of characters written on paper and produce the read-out characters as character codes capable of being processed on a computer, a character area is extracted from the document image, each of the characters is extracted from the extracted character area, and character recognition is executed for each division area.

In such a conventional character recognition system, since the character area is extracted before the character recognition process there may be errors in the extraction of the character due to causes such as blots and blurs of the image. If such errors occur, it is impossible to restore or compensate for the error, reducing the character recognition rate.

SUMMARY OF THE INVENTION

It is therefore an object of the present invention to provide a character recognition system having an improved recognition rate.

According to the present invention, there is provided a character recognition system comprising: feature extraction parameter storage means for storing a transformation matrix for reducing a number of dimensions of feature parameters and a codebook for quantization; HMM storage means for storing a constitution and parameters of a hidden Markov Model (HMM) for character string expression; feature extraction means for scanning a word image given from an image storage means from left to right in a predetermined cycle with a slit having a sufficiently smaller width than the character width and thus outputting a feature symbol at each predetermined timing, and matching means for matching a feature symbol row and a probability maximization HMM state, thereby recognizing the character string.

According to another aspect of the present invention, there is provided a character recognition system comprising: an image scanner; an image information storage means for storing document image data read out from the image scanner and pertaining image area information; a feature extraction parameter storage means for storing a transformation matrix to reduce a number of dimensions of feature parameters and a codebook to obtain feature symbols, the transformation matrix expressing each feature parameter which comprises multivariates as a small number of variates to minimize information loss, and previously calculated from a training sample feature parameter through main component analysis, the codebook being a set of codevectors used for quantization to express the transformed feature parameter with low bits, and previously calculated from the training sample feature parameter; a character string HMM storage means for storing a constitution and parameters of a character string HMM expression, the character string HMM being obtained by preparing one HMM for each character and adding a state transition from the completion state of each character to an initial state of each character HMM; an image extraction means for extracting an area with characters written therein from the document image and extracting rows and words from the extracted character area and storing word image area information thus obtained in the image information storage means; a feature extraction means for scanning the image of each word area from left to right in a predetermined cycle with a slit having a sufficiently smaller width than the character width and producing a feature symbol at each predetermined timing, and a matching means for making correspondence of the feature symbol sequence with a HMM state so as to maximize the probability of recognizing character string by utilizing the resultant optimum state transition sequence.

Other objects and features of the present invention will be clarified from the following description with reference to the attached drawings.

BRIEF DESCRIPTION OF THE DRAWINGS

FIG. 1 shows an embodiment of the present invention;

FIG. 2 shows a block diagram of the feature extraction means 32 in FIG. 1;

FIG. 3 shows an example of the transformation matrix in the embodiment;

FIG. 4 shows an example of the codevector on the embodiment;

FIG. 6 shows an example of the input image in the embodiment; and

DETAILED DESCRIPTION OF THE PREFERRED EMBODIMENTS

Figure 5:
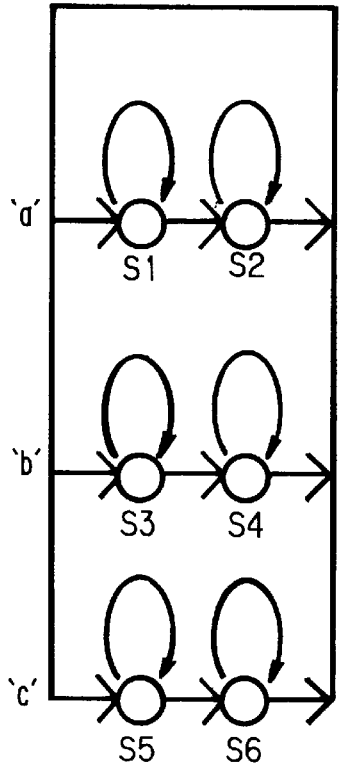
FIG. 5 shows a constitution and parameters of HMM in the embodiment.

The present invention will now be described with reference to the drawings. FIG. 1 shows an embodiment of the present invention. The embodiment comprises an input unit 1 such as an image scanner, a storage unit 2 for storing information, a data processor unit 3 operable under a program control, and an output unit 4 such as a display. The storage unit 2 includes an image information storage section 21, a feature extraction parameter storage section 22, and a character string HMM storage section 23. The term "HMM" is an abbreviation of "Hidden Markov Model". The data processor unit 3 includes word image division means 31, feature extraction means 32 and matching means 33.

The image information storage section 21 stores document image data read out from the image scanner and pertaining image area information.

In the feature extraction parameter storage section 22, a transformation matrix for reducing the dimension number of feature parameters and a codebook for obtaining feature symbols are prior to scanning the image. The transformation matrix is employed to express each feature parameter which comprises multivariates as a small number of variates to minimize the information loss, and it is previously calculated from a training sample feature parameter through main component analysis or the like. The codebook is a set of codevectors used for the quantization to express the transformed feature parameter with low bits, and it is previously calculated from the training sample feature parameter. The codebook may be obtained by, for instance, a method using a LBG algorithm or the like as disclosed in IEEE TRANSACTIONS ON COMMUNICATIONS, VOL. COM-28, NO.1, JANUARY 1980.

The character string HMM storage section 23 stores the constitution and parameters of HMM of the expression of the character string. Character string HMM is obtained by preparing one HMM for each character and adding a state transition from completion state of each character to initial state of each character HMM. Character HMM is constituted as a left-to-right HMM which has 2 to 8 states depending on the kinds of characters, and only self-transition and transition to the next state. Such parameters as the output symbol probability and state transition probability are previously determined for each HMM by using a large number of training samples. Parameters of the HMM may be determined by, for instance, a method using Baum-Wealch algorithm, as disclosed in "Speech Recognition with Probability Models", Seiichi Nakagawa, edited by the Society of Electronics Information Communication Engineers of Japan, 1988, pp. 55–60.

Document image data supplied from the input unit 1 is stored in the image data storage section 21. The image division means 31 extracts an area with characters written therein from the document image and divides rows and words from the extracted character area. Word image area information thus obtained is stored in the image information storage section 21. The extraction method of rows from the document image may be made by utilizing, for instance, a method disclosed in 1987, 35-th Information Processing Conference, in Japan, 5k-8. The extraction of words may be executed by a method such that when a blank in the image which is obtained by a longitudinal image projection has a length in excess of a predetermined threshold value, the detected blank is regarded to be an end of a word. This method is not directly relevant to the present invention, so it will not be described in detail.

The feature extraction means 32 scans the image of each word area from left to right in a predetermined cycle with a slit having a sufficiently smaller width than the character width and produces a feature symbol at each predetermined timing.

The feature extraction means 32 will now be described in detail with reference to FIG. 2. As shown in FIG. 2, the feature extraction means 32 includes feature parameter extraction means 321, feature parameter transformation means 322 and quantization means 323.

The feature parameter extraction means 321 extracts from the slit image feature parameters such as the number of strokes at the center of the slit, center position, run length, etc. The feature parameter transformation means 322 transforms the parameters using the transformation matrix stored in the feature extraction parameter storage section 22 to reduce the number of feature parameter dimensions. The quantization means 323 performs vector quantization of the transformed feature parameter by determining a codevector with the minimum distance from the transformed feature parameter among from the codevectors in the codebook stored in the feature extraction parameter storage section 22, and produces the obtained codevector's number (feature symbol).

The matching means 33 makes correspondence of the feature symbol sequence with a HMM state so as to maximize the probability of recognizing the character string by utilizing the resultant optimum state transition sequence. The optimum state transition sequence may be calculated by a method using a Viterbi algorithm disclosed in the foregoing "Speech Recognition with Probability Models", Seiich Nakagawa, edited by the Society of Electronics Information Communication Engineers in Japan, 1988, pp. 44–46. From the optimum state transition sequence thus obtained, a transition from the final state of each character HMM to a different state is extracted. Next, characters corresponding to the transition known are connected together to obtain the character string. Then, a character in the state corresponding to the final symbol in the feature symbol row is coupled to the end of the character string. The result is supplied as a result of recognition to the output unit 4.

Now, the embodiment will be described by taking a specific example. For the sake of brevity, it is assumed that the feature parameters are of four dimensions, i.e., number of center strokes, center position and first and second run lengths; the number of transformation dimensions is 2. The transformation matrix is as shown in FIG. 3. The number of symbols is 4. The codebook is as shown in FIG. 4. The character set to be recognized consists of three characters of "a", "b" and "c". The character HMM state number is 2, and the constitution and parameters of HMM are as shown in FIG. 5. In FIG. 5, the vertices and the directed arcs correspond to the states and the state transitions of the HMM. Output probability and transition probability of each state are shown in the table.

It is further assumed that one of the word image areas obtained as a result of division of an image given from the input unit 1 in the image division means 31, has an image as shown in FIG. 6.

Figure 7:
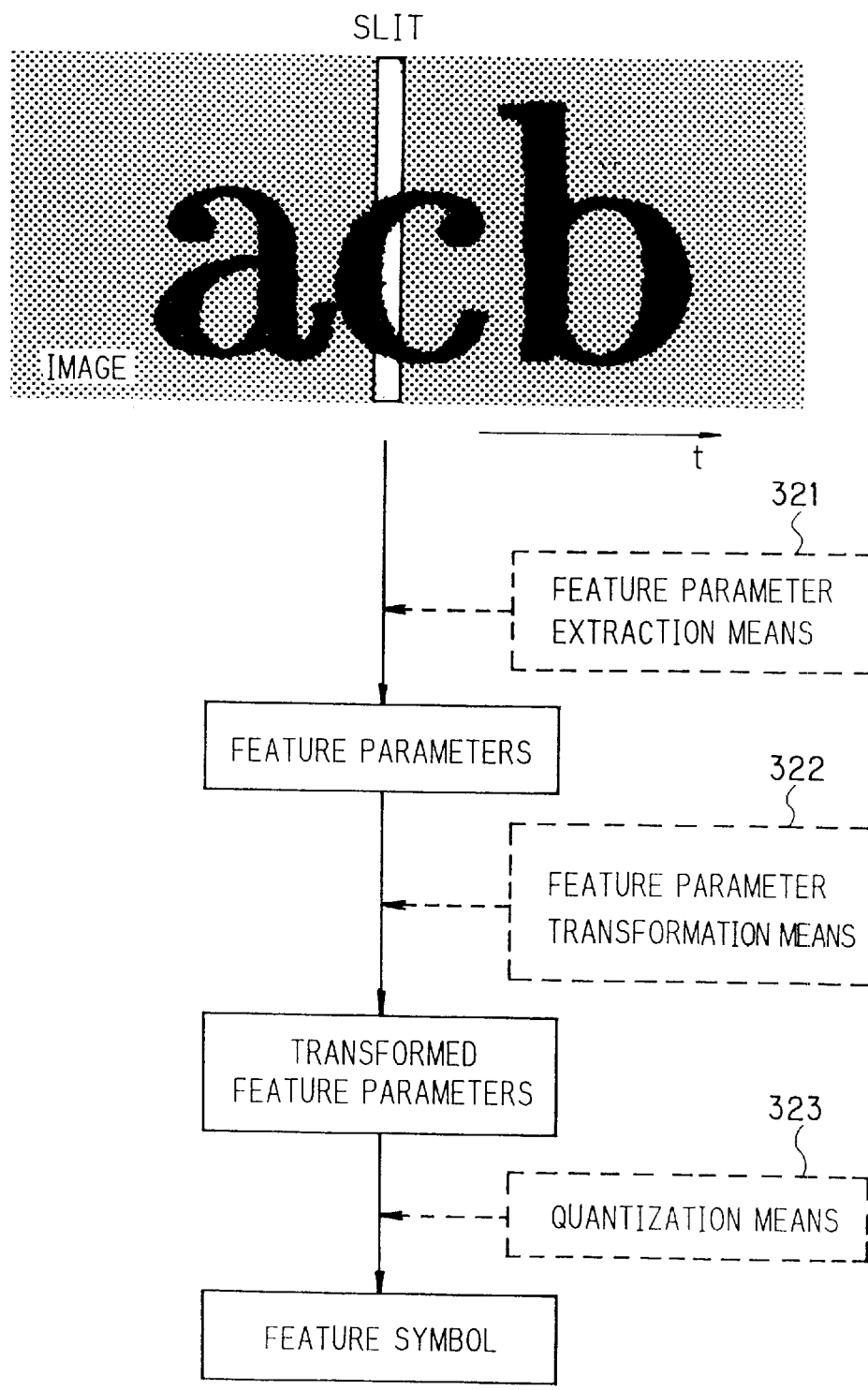
FIG. 7 shows a diagram for explaining the feature extraction method.

Referring to FIG. 7, first, the feature extraction means 32 scans the word image from left to right in a predetermined cycle with a slit having a sufficiently smaller width than the character width and supplies a feature symbol at each predetermined timing. For example, with slit No. 10 the feature parameter extraction means 321 extracts, as parameters, 2 as the number of strokes, 20 as the center position, and 5 and 7 as the first and second run lengths, respectively. The feature parameter transformation means 322 transforms these parameters with the transformation matrix (FIG. 3) to obtain a vector (9.0, 34.4). The quantization means 323 selects a codevector closest to the vector (9.0, 34.4) from the codebook (FIG. 4) to obtain symbol No. 2.

Now, it is assumed that a feature symbol sequence of "t=1, 2, 2, 8, 3, 4, . . . , 1" is obtained in this way. This sequence and the HMM (FIG. 5) stored in the HMM storage section are matched using the Viterbi algorithm to obtain an optimum state transition sequence.

It is assumed that an optimum state transition sequence of "S1, S1, S1, S1, S2, S2, S2, S2, S5, S5, S5, S5, S5, S6, S6, S6, S6, S6, S3, S3, S3, S3, S3, S4, S4, S4, S4, S4" is obtained in this way. In this case, transitions from the final state of each character to a different state that are extracted are one from S2 to S5 and one from S6 to S3. Characters that correspond to the transition known state of these transitions are "a" and "c". By adding these characters and then connecting, to the end of this character string, character (b) corresponding to the state S4 matched to the final symbol in the feature symbol sequence, a recognized character string of "acb" is obtained. This result is supplied to the output unit 4.

As has been described in the foregoing, in the character recognition system according to the present invention the division and recognition of word image are made simultaneously using HMM. It is thus possible to reduce recognition errors due to division errors.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A character recognition system comprising:

feature extraction parameter storage means for storing a transformation matrix for reducing a number of dimensions of feature parameters and a codebook for quantization;

HMM storage means for storing a constitution and parameters of a Hidden Markov Model (HMM) for character string expressions;

feature extraction means for scanning a word image, containing a string of characters, given from an image storage means from left to right in a predetermined cycle with a slit having a sufficiently smaller width than a character width and thus outputting a feature symbol at each predetermined timing; and matching means for matching a symbol row and a probability maximization HMM state, thereby recognizing each character within said string of characters.

2. A character recognition system as set forth in claim 1, wherein said character is a printed English character.

3. A character recognition system comprising:

an image scanner;

an image information storage means for storing document image data read out from said image scanner and pertinent image area information;

a feature extraction parameter storage means for storing a transformation matrix to reduce a number of dimensions of feature parameters and a codebook to obtain feature symbols, said transformation matrix expressing each feature parameter which comprises multivariates as a small number of variates to minimize information loss, and previously calculated from a training sample feature parameter through main component analysis, said codebook being a set of codevectors used for quantization to express the transformed feature parameter with low bits, and previously calculated from the training sample feature parameter;

a character string HMM storage means for storing a constitution and parameters of a character string HMM expression, said character string HMM being obtained by preparing one HMM for each character and adding a state transition from completion state of each character to initial state of each character HMM:

an image extraction means for extracting an area with characters written therein from the document image and extracting rows and words from the extracted character area and storing word image area information thus obtained in said image information storage means;

a feature extraction means for scanning the image of each word area from left to right in a predetermined cycle with a slit having a sufficiently smaller width than a character width and producing a feature symbol at each predetermined timing; and a matching means for making correspondence of the feature symbol sequence with a HMM state so as to maximize the probability of recognizing each character within a string of characters by utilizing the resultant optimum state transition sequence.

4. A character recognition system as set forth in claim 3, wherein from the obtained optimum state transition sequence, a transition from the final state of each character HMM to a different state is extracted, characters corresponding to the transition known are connected together to obtain the string of characters, and a character in the state corresponding to the final symbol in the feature symbol row is coupled to the end of the string.

5. A character recognition system as set forth in claim 3, wherein said feature extraction means comprises:

a feature parameter extraction means for extracting from the slit image feature parameters;

a feature parameter transformation means for transforming the parameters using the transformation matrix stored in said feature extraction parameter storage section to reduce the number of feature parameter dimensions; and a quantization means for performing vector quantization of the transformed feature parameter by determining a codevector with the minimum distance from the transformed feature parameter among from the codevectors in the codebook stored in said feature extraction parameter storage means, and producing the obtained codevector number corresponding to feature symbol.

6. A method for recognizing characters, comprising the steps of:

a transformation matrix for reducing a number of dimensions of character feature parameters and storing a codebook for quantization;

storing a constitution and parameters of a Hidden Markov Model (HMM) for a character string expression;

scanning a word image containing a string of characters given from an image storage means from left to right in a predetermined cycle with a slit having a sufficiently smaller width than a character width and outputting a feature symbol at each predetermined timing; and matching a symbol row and a probability maximization HMM state, thereby recognizing each character within said string of characters.

7. A method for recognizing characters comprising the steps of:

scanning a document image containing characters;

storing document image data read out from said scanning step and related document image area information;

storing a transformation matrix for reducing a number of dimensions of character feature parameters and a codebook to obtain feature symbols, said transformation matrix expressing each feature parameter which comprises multivariates as a smaller number of variates to minimize information loss, and being previously calculated from a training sample feature parameter through main component analysis, said codebook being a set of codevectors used for quantization to express the transformed feature parameter with fewer bits, and previously calculated from the training sample feature parameter;

storing a constitution and parameters of character string Hidden Markov Model expression, said character string HMM being obtained by preparing one HMM for each character and adding a state transition from a completion state of each character to an initial state of each character HMM:

extracting an area with a string of character written therein from the document image and extracting rows and words from the extracted character area and storing word image area information thus obtained in said image information storage means;

scanning the image of each word area from left to right in a predetermined cycle with a slit having a sufficiently smaller width than a character width and producing a feature symbol at each predetermined timing; and making correspondence of the feature symbol sequence with a HMM state so as to maximize the probability of recognizing each character within said string of characters by utilizing the resultant optimum state transition sequence.

* * * * *